United States Patent [19]
Shaumian, deceased et al.

[11] 3,948,121
[45] Apr. 6, 1976

[54] WORKPIECE LOADER

[76] Inventors: Grigor Arutjunovich Shaumian, deceased, late of Moscow, U.S.S.R.; by Alexandra Gavrilovna Strizhova, administrator, Ananievsky pereulok, 5, kv. 63, Moscow, U.S.S.R.; by Sergei Grigorievich Shaumian, administrator, Ananievsky pereulok, 5, kv. 63, Moscow, U.S.S.R.; by Era Grigorievna Kurpekova, administrator, Universitetsky prospekt 6, korpus 4, kv. 53, Moscow, U.S.S.R.; by Grinteza Grigorievna Shaumian, administrator, Universitetsky prospekt, 5, kv. 104, Moscow, U.S.S.R.

[22] Filed: June 4, 1975

[21] Appl. No.: 553,284

[52] U.S. Cl............................. 82/2.7; 82/3; 29/38 B
[51] Int. Cl.² ........................................ B23B 15/00
[58] Field of Search..................... 82/2.7, 3; 29/38 B

[56] References Cited
UNITED STATES PATENTS

| | | | |
|---|---|---|---|
| 1,980,440 | 11/1934 | Rupple | 82/2.7 X |
| 2,097,646 | 11/1937 | Rupple | 82/2.7 X |

*Primary Examiner*—Leonidas Vlachos

[57] ABSTRACT

The loader is adapted for feeding workpieces having a basic hole onto the spindles of a rotor-type automatic machine-tool during operation of the rotor carrying said spindles. The loader has a feed chute containing oriented workpieces, which, when in the machine loading position, makes up an angle with the axis of the spindle rotation so that the spindle itself is adapted, during rotor rotation, to effect a frictional catching of a workpiece from the feed chute at the top point of the basic hole thereof. For positively feeding said workpiece onto the spindle, provision is made for a pusher so arranged that its butt end facing the spindle is essentially at the same level with the top portion of the feed chute.

1 Claim, 4 Drawing Figures

WORKPIECE LOADER

BACKGROUND OF THE INVENTION

The present invention relates generally to devices for loading workpieces onto machine spindles and more specifically to such loaders for feeding workpieces having a basic hole, onto the spindles of a rotor-type automatic machine-tool.

The invention finds extensive application for loading workpieces shaped as rings, flanges, bushings, etc. onto the spindles of rotor-type automatic machine-tools, the spindles, while in operation, perform not only rotary motion but also a continuous or intermittent motion along a closed curve in a horizontal, vertical or inclined plane.

Prior Art

Some prior-art loaders are known to use for feeding workpieces having a basic hole onto the spindles of a rotary-type automatic machine-tool during rotation of the rotor carrying said spindles, comprising a feed chute or tray containing oriented workpieces, a device for catching workpieces from the chute and a pusher for force-feed of said workpiece onto the machine spindle.

However, the design of the known loaders for feeding workpieces having a basic hole, onto the spindles of an automatic machine suffers from some disadvantages.

In said known loaders, the device for an alternate catching of workpieces from the feed chute containing oriented workpieces and arranged at an angle and in a close proximity to the loading station of the machine, and feeding said workpieces onto the workpindles is defined by a rotor adapted to rotate in step with the rotor of the automatic machine carrying the rotating workspindles. The arrangement of the rotor-type device for catching and feeding workpieces in between the feed chute with oriented workpieces and the rotating rotor of the machine carrying the rotating workspindles, involves an increased machine loading zone (station); thus, with the machine cutting zone remaining invariable, the weight and size of the machine increases, accordingly.

Besides, more power is required for driving the rotor of the catching and feeding device which affects power consumption of the machine.

The provision of a great number of components in said loaders not only sophisticates their design but also adversely affects the operational reliability thereof, while the service life of said loaders is reduced due to the large amount of working rubbing surfaces. All this, in turn, tells very badly on the productivity of the automatic machines using said known loaders

OBJECTS AND SUMMARY OF THE INVENTION

It is a primary object of the present invention to provide a loader for feeding workpieces having a basic hole, onto the spindles of an automatic rotary-type machine, embodies a device for catching a workpiece from the feed chute, whereby said loader is of a simpler constructional arrangement as compared to the known loaders for a similar purpose.

It is another important object of the present invention to provide such a loader for feeding workpieces having a basic hole onto the spindles of an automatic rotary-type machine which is reliable in operation and has a long service life.

The above and other objects are accomplished in a loader for feeding workpieces having a basic hole onto the spindles of an automatic rotary-type machine during rotation of the rotor carrying said spindles, in which according to the invention, the feed chute, while in the machine loading position, makes up an angle with the axis of the spindle rotation so that the device for catching a workpiece from the feed chute is in fact said spindle which is adapted, during rotation of the rotor, to effect a frictional catching of the workpiece at the top point of its basic hole, while the pusher a force-feed of said workpiece onto the spindle is so arranged that its butt end facing the spindle is essentially at the same level with the top portion of the feed chute, whereas the distance from said pusher butt end to the spindle nose should be shorter than the distance from the pusher butt end to the top point of the workpiece basic hole.

Due to such a constructional arrangement, the present loader is reliable in operation and has long service life.

In the following the present invention is illustrated in a disclosure of a specific embodiment thereof and in a consideration of the accompanying drawings, wherein:

DETAILED DESCRIPTION OF THE PREFERRED EMBODIMENT

Figure 1:
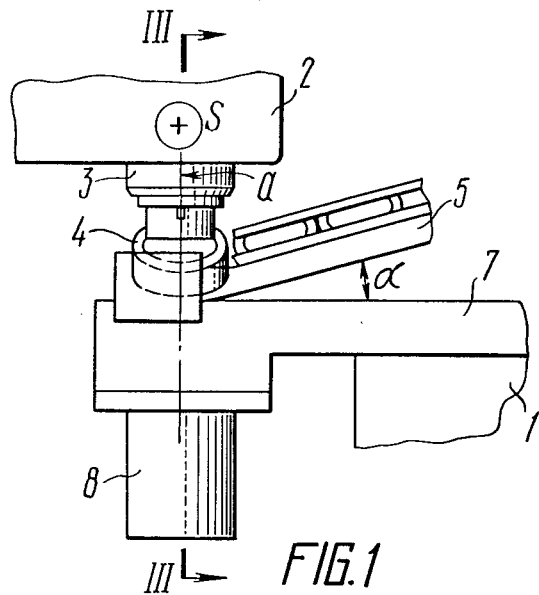
FIG. 1 is a general diagrammatic view of a workpiece loader, according to the invention, while in the loading position of an automatic rotor-type machine.

Disclosed herein is a loader for feeding workpieces having a basic hole, onto the spindles of an automatic rotor-type machine during rotation of the rotor carrying said spindles.

In the specific embodiment illustrated the automatic rotor-type machine has a base 1 (FIGS. 1 and 2) and a rotor 2, carrying spindles 3 of workpieces 4. The present loader assumes the loading position of the automatic machine. The loader comprises a feed chute 5 containing the oriented workpieces 4, a device for a one-by-one catching of the workpiece 4 from the feed chute 5, and a pusher 6 (FIGS. 3 and 4) for a force-feed of the workpiece onto the spindle 3 of the automatic machine.

According to the invention, the feed chute 5 assuming the loading station of the machine, makes up an angle with the axis ($a$) of rotation of the spindle 3 so that the spindle, during rotation of the rotor 2, effects a frictional catching of the workpiece 4 at a top point ($b$) of a basic hole ($c$) thereof (i.e., the spindle 3 serves in fact as the device for catching one-by-one the workpieces 4 from the feed chute 5 (FIG. 3), whereas the pusher 6 (FIGS. 3 and 4) for the force-feed of the workpiece 4 onto the spindle 3 is so arranged that its butt end ($d$) is essentially at the same level with a top portion (*e*) of the feed chute 5. Besides, a distance (*h*) (FIG. 3) between the butt end (*d*) of a pusher and the nose (*f*) of the spindle 3, facing each other, should be shorter than a distance H from the butt end (*d*) of the pusher 6 to the top point (*b*) of the basic hole (*c*) of the workpiece 4.

The loader is mounted on the base 1 (FIG. 1) by means of a bedplate 7, on which are carried the feed chute 5 and the pusher 6 (FIGS. 3 and 4) with its drive 8 to reciprocate along the axis (*a*) of the spindle 3 rotation.

The feed chute 5 makes up an angle α with the bedplate 7 (FIG. 1), the magnitude of which is selected proceeding from that the workpieces 4 travel along the feed chute 5 to the machine loading station under their own weight.

When in the loading position, the feed chute 5 is inclined to the axis (*a*) of the spindle rotation at an angle β (FIG. 3) whose magnitude is so selected as to ensure a frictional catching of the workpiece 4 at the top point (*b*) of its basic hole (*c*) by the spindle 3 and make possible a free and stickless setting of the workpiece upon the spindle 3 during rotation of the rotor carrying the spindles, as well as travelling of the workpiece 4 towards the top portion (*e*) of the feed chute 5.

Figure 3:
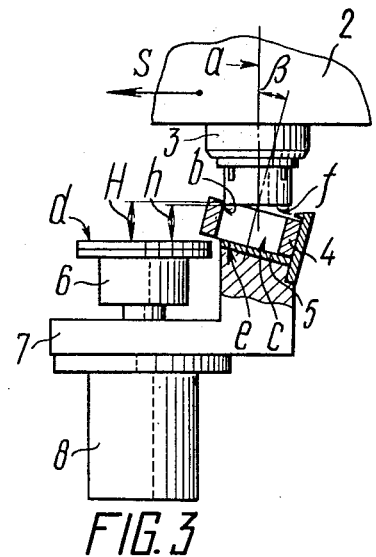
FIG. 3 is a section taken along the line III-III in FIG. 1, the view looking in the direction of the arrows to illustrate the mutual arrangement of the pusher, spindle and workpiece at the moment of a frictional catching of the latter during rotor rotation.
Figure 2:
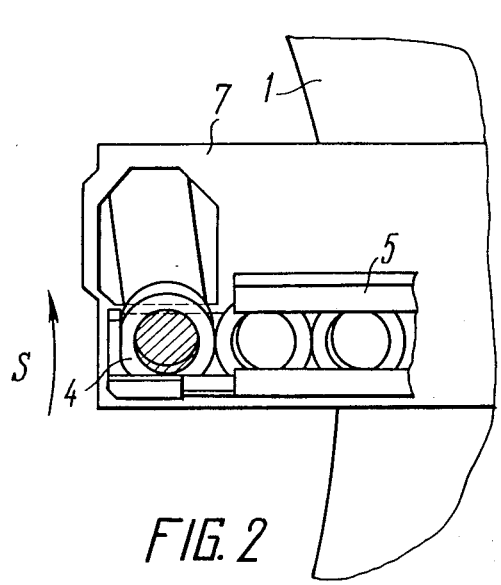
FIG. 2 is a top view of FIG. 1, with the rotor out of position.

The loader operates as follows:

The appropriately oriented workpieces 4 are charged into the feed chute 5. Under their own weight to workpieces are fed one by one to the loading station of the automatic machine and set at the angle β to the axis (*a*) of rotation of the spindle 3 (FIGS. 1, 2 and 3). When the rotor 2 (FIG. 3) rotates in direction S, the spindle 3 effects a frictional catching of one of the workpieces 4 contained in the feed chute at the top point (*b*) of the basic hole (*c*) of to workpiece, and moves the latter along the path of its own movement as a result, the workpiece 4 due to its being raised along the feed chute 5 inclined at the angle β, is placed onto the spindle 3.

With further movement of the rotor 2, the workpiece 4 caught by the spindle 3, passes over the top protion (*e*) of the feed chute 5 and under its own weight is caused to assume a horizontal position with respect to the butt end (*d*) of the pusher 6. Since as the nose (*f*) of the spindle 3 is spaced apart from the butt end (*d*) of the pusher 6 at the distance (*h*) shorter than the distance (H) from the butt end (*d*) of the pusher 6 to the top point (*b*) of the basic hole (*c*) of the workpiece 4, the spindle 3 will continually perform a frictional catching of the workpiece 4 while the rotor 2 is running. When the workpiece 4 passes along the butt end (*d*) of the pusher 6, the latter performs an upward motion along the axis (*a*) of the spindle 3 rotation, imparted from the drive 8, and positively feeds the workpiece 4 onto the spindle 3 as far as it will go.

Figure 4:
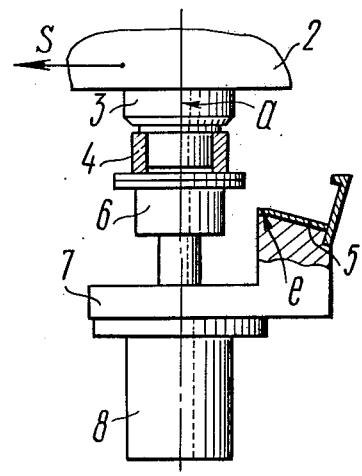
FIG. 4 is the sectional view represented in FIG. 3 to illustrate the mutual arrangement of the pusher and spindle with the workpiece at the moment of a positive feed of the latter.

FIG. 4 illustrates the position, in which the workpiece 4 is brought by the pusher 6 until meeting a stop on the spindle 3 (the stop being not shown in the drawing).

Any power cylinder may be used as the drive 8.

Upon clamping the workpiece 4 on the spindle 3 by any conventional method suitable for the purpose, the pusher 6 moves down to assume its initial position as shown in FIG. 3.

As soon as the spindle 3 transfers one of the workpieces 4 from the feed chute 5 to the loading station, the next workpiece is coming along the feed chute to the loading station, and the process is repeated.

Thus, in the present loader, the spindle 3 per se of the automatic machine serves as the device for catching one workpiece 4 from the feed chute 5. This simplifies materially the construction of the loader as compared to known loaders of a similar type. In addition, the constructional arrangement of the loader is responsible for its reliable operation, reduced cost of manufacture, as well as a lower cost of in-service repairs and maintenance operations.

The present loader is applicable to machines in which spindles are imparted not only rotary but also a continuous or intermittent motion along a closed curve in a horizontal, vertical or inclined plane.

What we claim is:

1. In an automatic rotor-type machine having a rotor and at least one spindle mounted on the rotor, the spindle having an axis of rotation and a nose, said spindle being adapted for carrying a workpiece having a basic hole with a top point; and a loader for feeding a workpiece having a basic hole onto the at least one spindle during rotation of the rotor, said loader comprising: a feed chute containing workpieces in an oriented state, said feed chute having a top portion; a device for catching one of said workpieces contained in said feed chute; and a pusher for a force-feed of said caught workpiece onto the at least one spindle, said pusher having a butt end facing said at least one spindle, the improvement that said feed chute, when in a machine loading position, is positioned at an incline to the axis of rotation of said at least one spindle so that serving as said catching device is said at least one spindle which is adapted, during rotation of said rotor, to effect a frictional catching of said workpiece at the top point of said basic hole thereof; and said pusher being so arranged that its butt end facing said at least one spindle is essentially at the same level with the top portion of said feed chute, while the distance between said pusher butt end to the nose of said at least one spindle, facing said butt end is shorter than the distance from said butt end of said pusher to said top point of the basic hole of said workpiece so that said at least one spindle will continually perform a frictional catching of the workpiece during running of the rotor.

* * * * *